United States Patent
Adams, IV et al.

(10) Patent No.: US 9,936,828 B1
(45) Date of Patent: Apr. 10, 2018

(54) SUCTION MOUNTED DOOR HOOK

(71) Applicant: Adams Mfg. Corp., Portersville, PA (US)

(72) Inventors: William E. Adams, IV, Zelienople, PA (US); Matthew Goodworth, Pittsburgh, PA (US)

(73) Assignee: Adams Mfg. Corp., Portersville, PA (US)

( * ) Notice: Subject to any disclaimer, the term of this patent is extended or adjusted under 35 U.S.C. 154(b) by 0 days.

(21) Appl. No.: 15/633,059

(22) Filed: Jun. 26, 2017

(51) Int. Cl.
| | | |
|---|---|---|
| *A45D 42/14* | (2006.01) | |
| *F16B 47/00* | (2006.01) | |
| *A47G 1/17* | (2006.01) | |
| *A47G 25/06* | (2006.01) | |

(52) U.S. Cl.
CPC ............ *A47G 1/17* (2013.01); *A47G 25/0614* (2013.01); *F16B 47/00* (2013.01)

(58) Field of Classification Search
CPC .................................. A47G 1/17; F16B 47/00
USPC ......... 248/683, 690, 691, 692, 205.5, 205.6, 248/206.1, 206.3, 206.4, 304, 308, 324, 248/339, 341, 300, 301, 302, 303, 309.3
See application file for complete search history.

(56) References Cited

U.S. PATENT DOCUMENTS

| | | | | | |
|---|---|---|---|---|---|
| 1,518,824 | A | * | 12/1924 | Smith ..................... | A47H 19/00 160/349.2 |
| 1,859,893 | A | * | 5/1932 | Ritz-Woller ............ | F16B 47/00 24/305 |
| 2,980,379 | A | * | 4/1961 | Goldfus .................. | F16B 47/00 224/282 |
| 5,005,790 | A | * | 4/1991 | Harris, III .............. | A01G 25/00 248/213 |
| 5,078,356 | A | * | 1/1992 | Adams .................... | F16B 47/00 248/206.2 |
| 5,114,106 | A | * | 5/1992 | Daugherty .............. | A47G 7/044 248/206.4 |
| 5,141,192 | A | * | 8/1992 | Adams .................... | F21V 21/088 248/229.26 |
| 5,402,974 | A | * | 4/1995 | Adams .................... | F16B 47/00 248/205.5 |
| 5,542,631 | A | * | 8/1996 | Bruno ..................... | F16L 3/133 248/289.11 |
| D408,725 | S | * | 4/1999 | Adams .................... | D8/373 |
| 6,131,865 | A | * | 10/2000 | Adams .................... | A47G 1/17 248/205.5 |

(Continued)

*Primary Examiner* — Terrell L McKinnon
*Assistant Examiner* — Michael McDuffie
(74) *Attorney, Agent, or Firm* — Buchanan Ingersoll & Rooney PC (57) ABSTRACT

A suction mounted door hook has two suctions cups and a hook connected to the two suction cups. Each suction cup has a cup portion and a loop portion attached to the cup portion such that the loop portion and a surface of the cup portion define an opening. There is a recess on that surface of the cup portion and a pair of spaced apart loop projections on the top surface and preferably on the bottom surface of the loop portion that have a recess between them which is opposite the recess in the cup portion. The hook has an S-shaped body and two legs, one leg being within the opening of each suction cup. The hook can be in either an extended position or a folded position. Surfaces and projections on the hook mate with the recesses in the suction cups to hold the hook in either position.

16 Claims, 9 Drawing Sheets

(56) References Cited

U.S. PATENT DOCUMENTS

| | | | | |
|---|---|---|---|---|
| 6,325,344 | B1* | 12/2001 | Gary | A47G 1/17 |
| | | | | 248/206.3 |
| 6,550,735 | B1* | 4/2003 | Zheng | F16B 47/00 |
| | | | | 248/205.5 |
| 6,869,053 | B2* | 3/2005 | Adams, IV | F16B 47/00 |
| | | | | 248/206.2 |
| 7,059,010 | B2* | 6/2006 | Heneghan | A47L 4/04 |
| | | | | 15/268 |
| D552,458 | S | 10/2007 | Adams et al. | |
| D608,624 | S | 1/2010 | Adams | |
| D609,556 | S | 2/2010 | Adams | |
| 8,480,045 | B2* | 7/2013 | Adams, IV | F16B 47/00 |
| | | | | 248/205.5 |
| 9,422,970 | B1* | 8/2016 | Fan | F16B 47/00 |
| 2002/0125392 | A1* | 9/2002 | Zhadanov | F16B 47/00 |
| | | | | 248/313 |
| 2003/0201369 | A1* | 10/2003 | Dretzka | F16B 47/00 |
| | | | | 248/206.2 |

* cited by examiner

SUCTION MOUNTED DOOR HOOK

FIELD OF THE INVENTION

The present invention is related to hooks for holding an object on a door or other vertical surface.

BACKGROUND OF THE INVENTION

There are a variety of suction mounted hooks that are known in the art. These products usually consist of a single suction cup and a rigid hook attached to the suction cup. United States Design Patent Nos. D408,725, D552,458 and D608,624 disclose suction mounted hooks having a loop as its head and a rigid hook that passes through the loop. A J-hook is provided in the products disclosed in Design Patent Nos. D408,725 and D608,624. The top of the J-hook is shaped as a T or a modified rectangle to prevent the hook from passing through or rotating within the loop of the suction cup. There may also be a recess in the surface of cup portion of the suction cup that is within the loop in which a portion of the hook is seated. The suction cup shown in each of these two design patents has such a recess. All of the hooks disclosed in Design Patent Nos. D408,725, D552,458 and D608,624 are designed so that the hook will always be substantially perpendicular to the surface on which the product is mounted. Therefore, the hook cannot be easily rotated ninety degrees to be parallel to a mounting surface. Yet when the hook is in such a parallel position it would fit in a thinner package that would require less space on a store shelf or rack.

The weight that can be held on the suction mounted hooks is related to the diameter of the suction cup. The larger the suction cup the greater the weight that can be held. Hooks that are designed to be mounted with two suction cups can hold more weight than suction mounted hooks having a single suction cup of the same size. Suction mounted hooks that have two suction cups will have a larger hook and require a bigger package.

Because the suction cup is made of a flexible material and the hook is rigid the hook can, and often does, move relative to the suction cup when a lateral force acts on the hook. This can occur when something is placed on or removed from the hook or when a wreath or other object is hung on a door mounted hook and the door is opened or closed.

Consequently, there is a need for a suction mounted hook which can be hung on a door, hold a wreath or other object of similar size and weight and be constructed so that the hook can be moved relative to the suction cup between a position that is substantially perpendicular to the surface on which the product is mounted and a position parallel to that mounting surface.

SUMMARY OF THE INVENTION

We provide a suction mounted door hook having two suctions cups and a hook connected to the two suction cups. Each suction cup has a cup portion and a loop portion attached to the cup portion such that the loop portion and a surface of the cup portion define an opening. There is a recess on that surface of the cup portion. A pair of spaced apart loop projections are on the top surface of the loop portion and have a recess between them which is opposite the recess in the cup portion. We prefer to provide similar projections on the bottom surface of the loop. The hook has an S-shaped body with a first end, a second end, an upper portion containing the first end and a lower portion containing the second end. There is a first leg attached to the first end. The first leg has a curved face and a pair of projections on opposite sides of the leg. There is also a second leg attached to the lower portion of the S-shaped body which also has a curved face. The legs are positioned such that there is a straight line passing through both the first leg and the second leg which will be substantially parallel to the surface on which the product is mounted. The second leg and the lower portion of the S-shaped body define a second opening sized to receive the loop portion of the second suction cup. A pair of hook body projections attached to the lower portion of the S-shaped body extend into the second opening and are sized and positioned to engage the loop of the second suction cup. The first leg of the hook is within the opening in the first suction cup and the second leg is within the opening of the second suction cup.

The hook can be positioned relative to the suction cups to be in an extended position for use or in a folded position for packaging, shipment and storage. The recesses on the suction cup that mate with corresponding surfaces on the hook hold the hook securely on the suction cups in either the extended position or the folded position.

Other objects and advantages our suction mounted door hook will become apparent from a description of a present preferred embodiment shown in the drawings.

BRIEF DESCRIPTION OF THE DRAWINGS

A present preferred embodiment of our suction mounted door hook is shown in the accompanying drawings.

DETAILED DESCRIPTION OF PRESENT PREFERRED EMBODIMENTS

Figure 1:
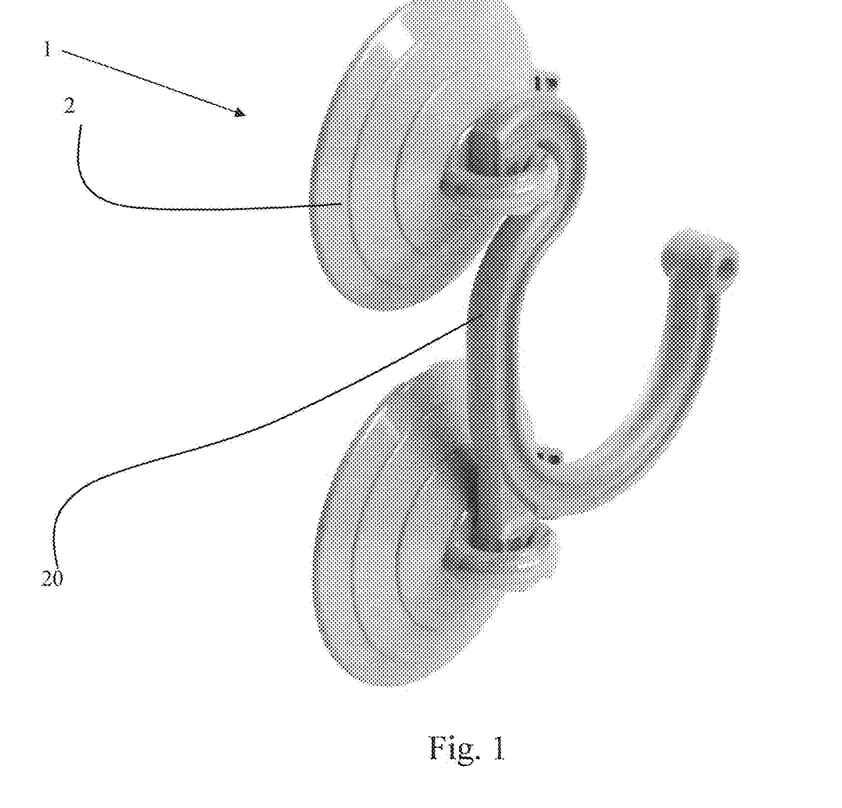
FIG. 1 is a perspective view of a first present preferred embodiment of our suction mounted door hook in a folded position suitable for packaging and storage.
Figure 2:
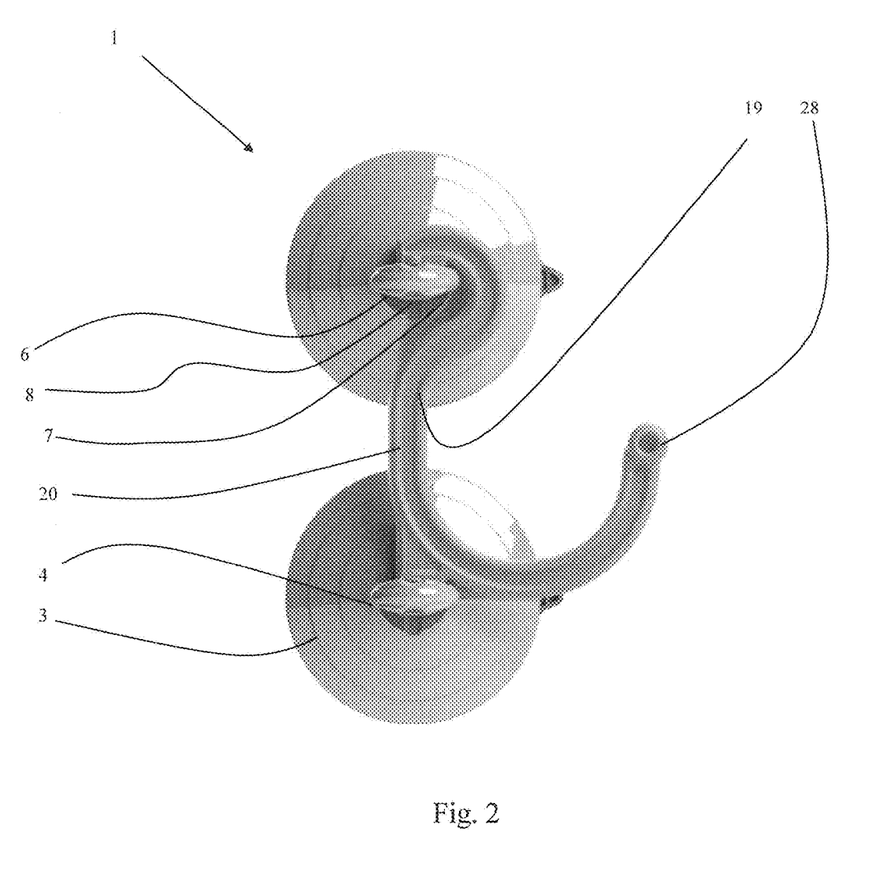
FIG. 2 is a front view thereof.
Figure 3:
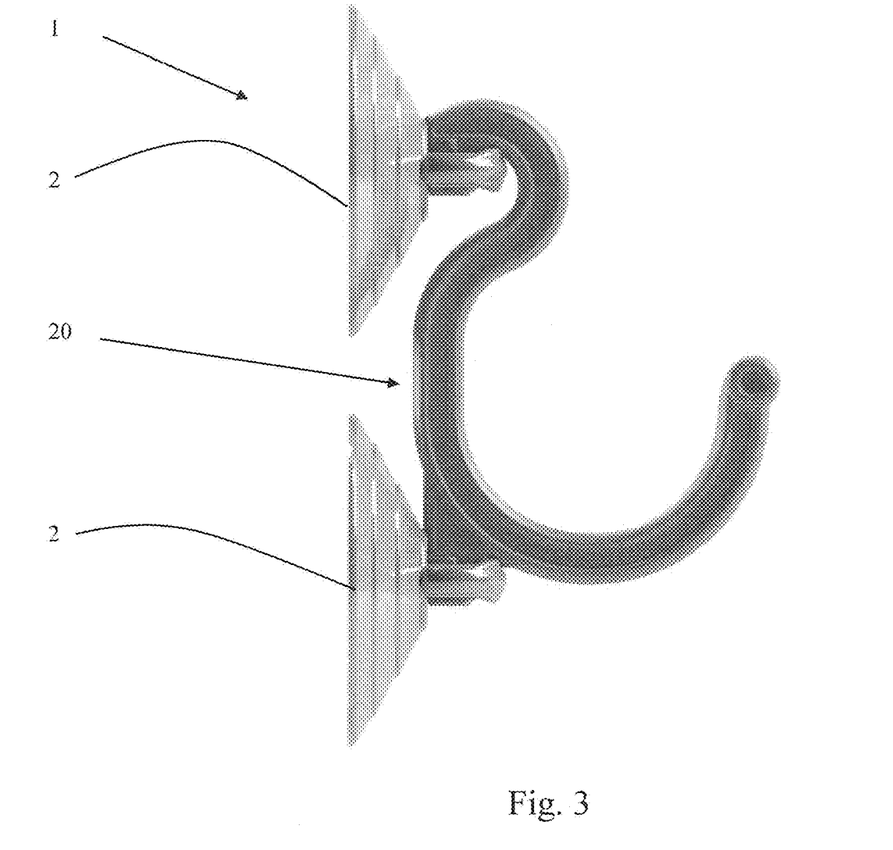
FIG. 3 is a side view of the embodiment shown in FIGS. 1 and 2 with the hook in an extended position for use.

Referring to the drawings a present preferred embodiment of the suction mounted door hook 1 has a pair of suctions cups 2 and a rigid hook 20. Each suction cup 2 has a cup portion 3 and a loop portion 4 attached to the cup portion. A recess 5 is provided in the surface of the suction cup that together with the loop portion 4 defines and opening 10 in which a leg 21, 22 of the hook 20 is received. Opposing sloped projections 7, 6 are provided on the upper surface and the lower surface of the loop portion. There is a recess 8 between each pair of sloped projections. The slopes enable the hook to me more easily moved from the folded position shown in FIGS. 1 and 2 to the extended position shown in FIG. 3. When the hook reaches the extended position there may be an audible click and the user will feel the hook snap into place.

Figure 7:
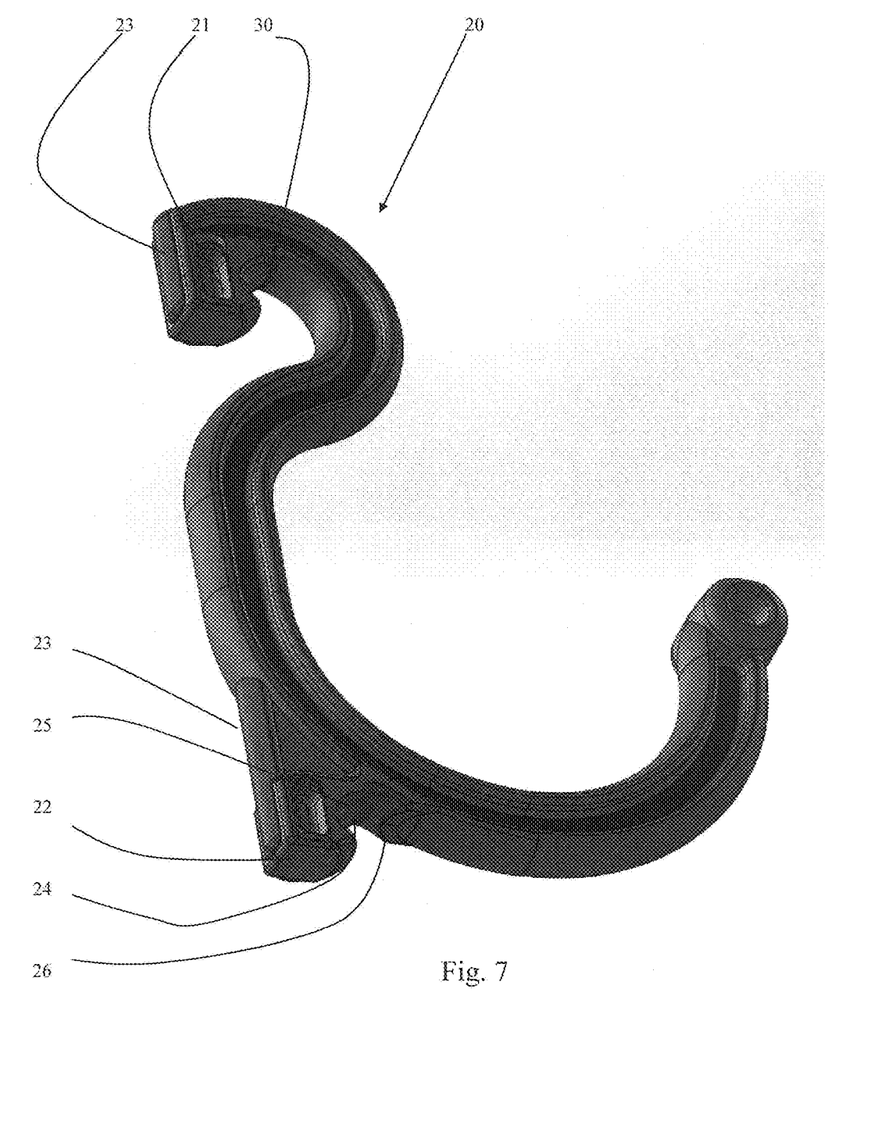
FIG. 7 is a perspective view of the hook used in the embodiment shown in FIGS. 1 through 5.
Figure 8:
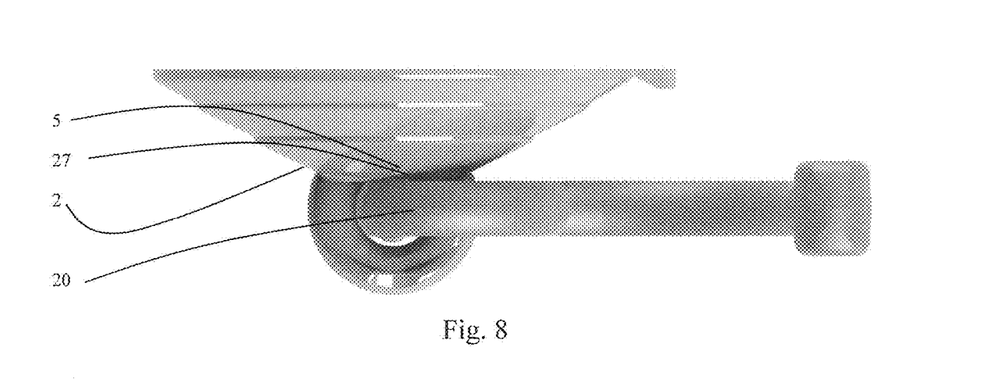
FIG. 8 is a top view of the embodiment shown in FIGS. 1 through 7 with the hook in the folded position.

As can be seen most clearly in FIG. 7 the hook 20 has a generally S-shaped body having a first, upper leg 21 and a second, lower leg 22. The first leg 21 is on the upper end of the hook 20 and has a curved back 30 sized to fit over the loop. The second leg 22 extends from the lower portion of the hook and is positioned so that both legs are collinear on a line A-A that would be parallel to the mounting surface to which the suction mounted door hook is attached. Each leg has a rounded face 23 that is shaped to fit within the recess 8 in the suction cup 2 when the hook is in the extended position shown in FIG. 3. As can be seen more clearly in FIG. 4, when the hook is in the extended position the upper end of the hook 20 will be in recess 5 and the face of the first leg will be in recess 8.

Figure 9:
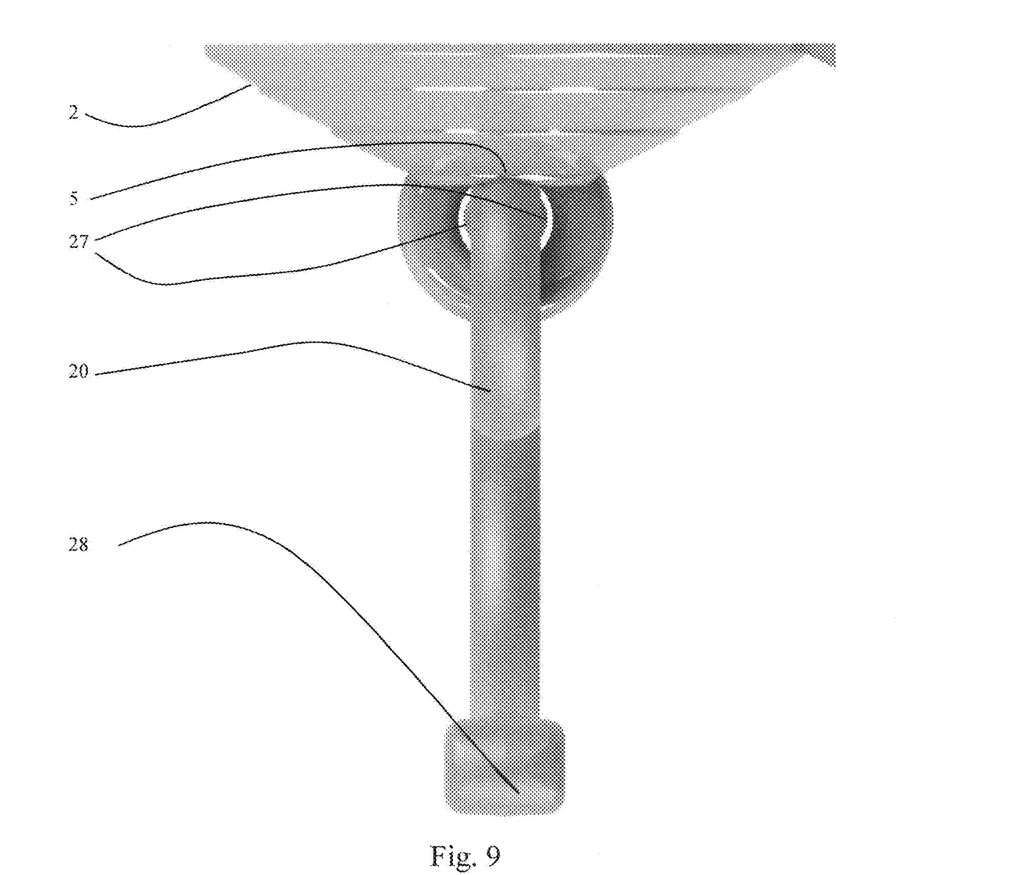
FIG. 9 is a top view similar to FIG. 8 with the hook in the extended position.

There is a pair of rounded tabs 27 at the top of the first leg 21. One of the tabs is on one side of the hook and can be seen in FIGS. 3, 4 and 7. The second tab is in a similar position on the opposite side of the hook as seen FIG. 9. When the hook is in the folded position shown in FIGS. 1, 2 5 and 8 one tab will be in or adjacent recess 8 at the front of the loop and the second opposite tab will be in recess 5 on the cup portion of the suction cup. These tabs and recesses together hold the hook at the folded position.

Referring to FIG. 7 the back of the second leg 22 and a portion of the hook body adjacent that leg define an opening 24 sized to receive the loop portion 4 of the suction cup 2. Projections 25 and 26 are sized and located to fit within the recess 8 defined by opposing sloped projections 6, 7 on the loop portion 4 of the suction cup when the hook 20 is positioned in the extended position shown in FIG. 3. When so positioned then hook will be perpendicular to a mounting surface on which the product is mounted. The engagement of the projections 25 and 26 with the loop between projections 5, 6 can be most clearly seen in FIGS. 3 and 4. The distal end 28 of the hook may be T-shaped as shown in the drawings or have another configuration.

We prefer to make the hook of a rigid plastic such as polycarbonate. To reduce the amount of plastic in the hook while maintaining the desired strength we prefer that most of the hook have an I-beam cross-section with the center being thinner than the edges.

The suction cup is preferably vinyl, but could be made of silicone, TPE or rubber. We prefer to provide a pair of projections on both the top surface and the bottom surface of the loop portion. However, one could provide the projections on only the top surface of the loop. If that is done then the suction cup must always be oriented to have the projections facing upward.

We have found that providing recesses on the suction cup that mate with corresponding surfaces on the hook holds the hook securely on the suction cups. When applying a lateral force on the hook with a pull gauge, the recesses allowed the hook to resist a force of about 1.5 lbs. and the hook only moved slightly from perpendicular. When applying the same lateral force with no recesses present, the hook moved to almost 45 degrees from perpendicular. If needed, the recesses could be made larger and more aggressive to increase the strength of the lock. For the most common applications of hanging a wreath, robe, or coat on a hook, the hook may swing a little side-to-side as a door is opened and closed due to the suction cup flexing, but the test results indicate that the hook should generally stay perpendicular to the door when used on a door that is being opened and closed.

Figure 4:
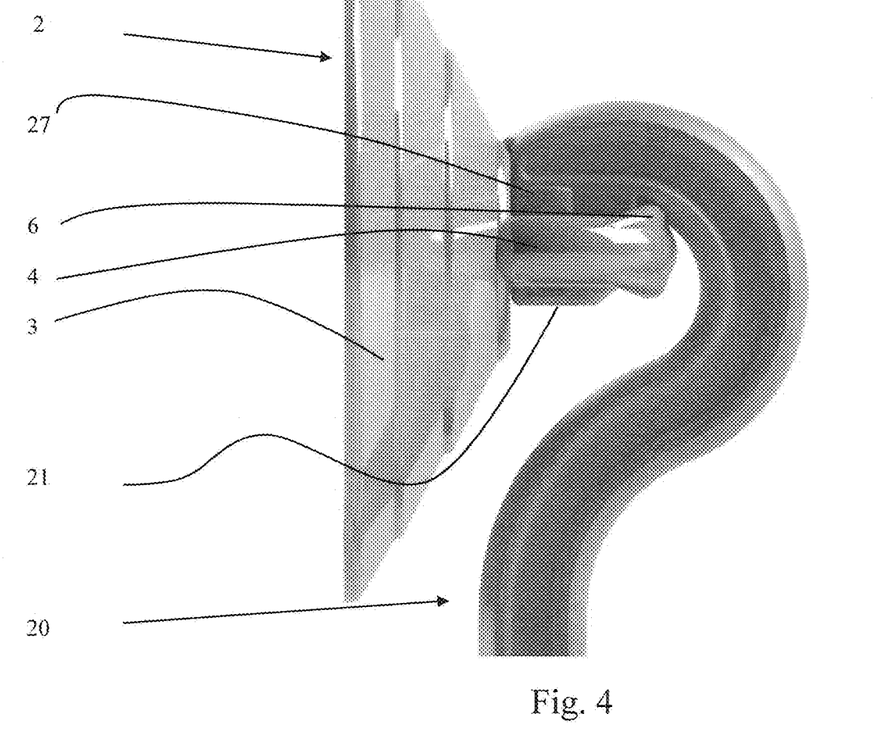
FIG. 4 is a right side view of the upper suction cup and upper portion of the hook in the embodiment shown in FIG. 3.
Figure 5:
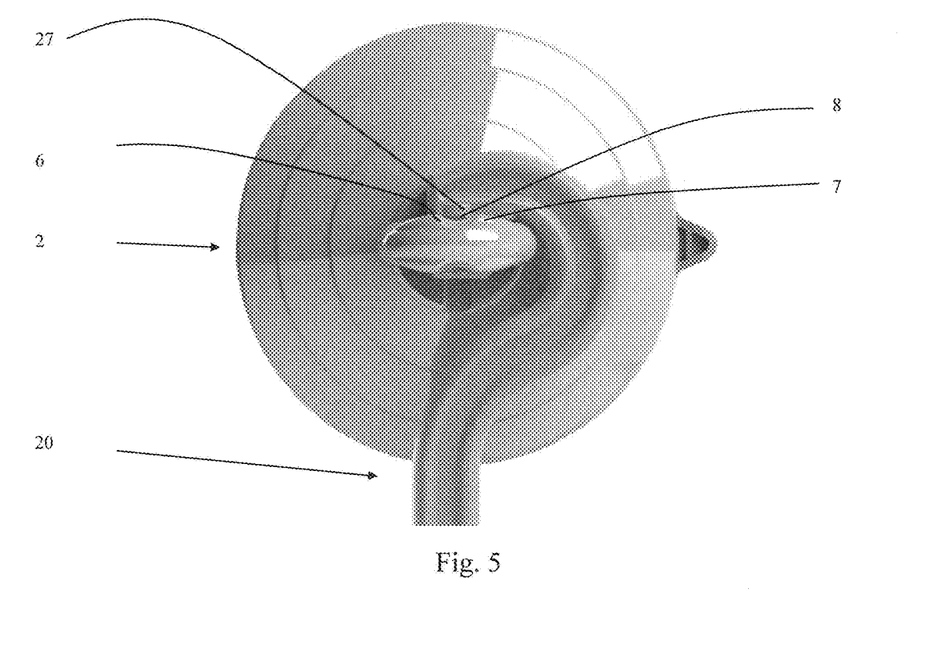
FIG. 5 is a view of the upper suction cup and upper portion of the hook in the embodiment shown in FIGS. 1 and 2.
Figure 6:
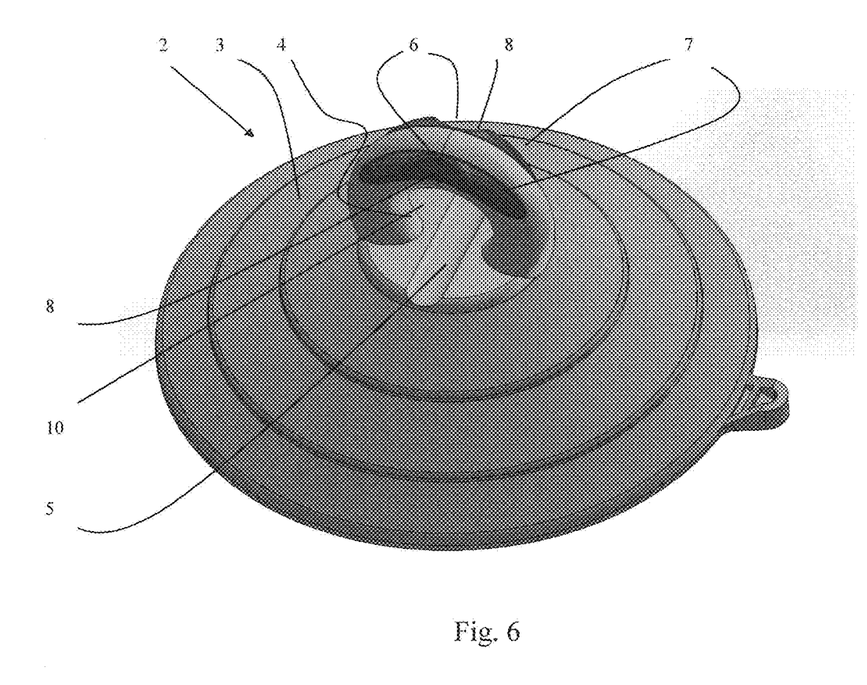
FIG. 6 is a perspective view of the suction cup used in the embodiment shown in FIGS. 1 through 5.

As second preferred embodiment we provide a single suction cup having as S-shaped hook which would be similar to what is shown in FIGS. 4 and 5. The suction cup has a cup portion and a loop portion attached to the cup portion such that the loop portion and a surface of the cup portion define an opening. There is a recess on the surface of the cup portion. The hook has an S-shaped body with a first end and a second end. There is a leg attached to the first end, the leg having a curved face and a pair of tabs on opposite sides of the leg. The curved face and the each tab are sized and configured to fit into the recess and hold the hook in a selected position such that the curved face or a tab remains in the recess until a sufficient lateral force act on the hook. One could also provide loop projections as in the embodiment shown in FIGS. 4 and 5.

Although we have called our product a suction mounted door hook, use of the product is not limited to being attached to a door. The hook could be attached to any smooth surface including a wall (such as a tile or acrylic shower wall) or a window.

While we have described and shown certain present preferred embodiments of our suction mounted door hook it should be distinctly understood that our invention is not limited thereto, but may be variously embodied within the scope of the following claims.

We claim:

1. A suction mounted door hook comprising:
    a first suction cup and a second suction cup, each suction cup comprised of:
    a cup portion and a loop portion attached to the cup portion such that the loop portion and a surface of the cup portion define an opening, the surface of the cup portion having a first recess, the loop portion having a top surface and a bottom surface, and
    a pair of spaced apart loop projections on the top surface of the loop portion, the spaced apart loop projections having a second recess between them, the pair of spaced apart loop projections being sized and positioned so that the second recess is opposite the first recess; and
    a hook comprised of:
        an S-shaped body with a first end, a second end, an upper portion containing the first end and a lower portion containing the second end;
        a first leg attached to the first end, the first leg having a curved face and a pair of tabs on opposite sides of the first leg;
        a second leg attached to the lower portion of the S-shaped body, the second leg having a curved face, the second leg being positioned such that there is a straight line passing through both the first leg and the second leg, the second leg and the lower portion of the S-shaped body defining a second opening sized to receive the loop portion of the second suction cup; and
        a pair of hook body projections attached to the lower portion of the S-shaped body and extending into the second opening, the pair of hook body projections sized and positioned to engage the loop of the second suction cup;
    wherein the first leg is within the opening in the first suction cup and the second leg is within the opening in the second suction cup.

2. The suction mounted door hook of claim 1 wherein the loop projections are sloped downward away from the second recess.

3. The suction mounted door hook of claim 1 also comprising a second pair of spaced apart loop projections on the bottom surface of the loop portion, the spaced apart loop projections having a third recess between them, the second pair of spaced apart loop projections being sized and positioned so that the third recess is opposite the first recess.

4. The suction mounted door hook of claim 1 wherein the curved face of the first leg is within the first recess of the first suction cup and the curved face of the second leg is within the first recess of the second suction cup.

5. The suction mounted door hook of claim 1 wherein one of the pair of tabs on the first leg is within the first recess of the first suction cup and the other tab on the first leg is within the second recess of the first suction cup.

6. The suction mounted door hook of claim 1 wherein the first leg has a curved back sized and configured to fit over the loop portion of the first cup.

7. The suction mounted door hook of claim 1 wherein at least a portion of the S-shaped body of the hook has an I-beam cross-section.

8. The suction mounted door hook of claim 1 wherein the second end of the hook is T-shaped.

9. The suction mounted door hook of claim 1 wherein the first suction cup and the second suction cup are vinyl and the hook is plastic.

10. The suction mounted door hook of claim 9 wherein plastic is polycarbonate.

11. A suction mounted door hook comprising:
   a suction cup comprised of a cup portion and a loop portion attached to the cup portion such that the loop portion and a surface of the cup portion define an opening, the surface of the cup portion having a first recess; and
   a hook comprised of:
      an S-shaped body with a first end and a second end: and
      a leg attached to the first end, the leg having a curved face and a pair of tabs on opposite sides of the leg, the curved face and the each tab sized and configured to fit into the first recess and hold the hook in a selected position such that the curved face or a tab remains in the first recess until a sufficient lateral force acts on the hook; and
   wherein the leg is within the opening in the suction cup.

12. The suction mounted door hook of claim 11 wherein the suction cup is vinyl and the hook is plastic.

13. The suction mounted door hook of claim 12 wherein plastic is polycarbonate.

14. The suction cup of claim 11 wherein the loop portion having a top surface and a bottom surface, also comprising a pair of spaced apart loop projections on the top surface of the loop portion, the spaced apart loop projections having a second recess between them, the pair of spaced apart loop projections being sized and positioned so that the second recess is opposite the first recess.

15. The suction mounted door hook of claim 14 wherein the loop projections are sloped downward away from the second recess.

16. The suction mounted door hook of claim 14 also comprising a second pair of spaced apart loop projections on the bottom surface of the loop portion, the spaced apart loop projections having a third recess between them, the second pair of spaced apart loop projections being sized and positioned so that the third recess is opposite the first recess.

* * * * *